Patented Sept. 3, 1946

2,407,096

UNITED STATES PATENT OFFICE 2,407,096

ANTIANEMIA VITAMIN PRODUCTS

Joseph J. Pfiffner, Ann Arbor, and Stephen B. Binkley, Edward S. Bloom, and Arthur D. Emmett, Detroit, Mich., assignors to Parke, Davis & Company, Detroit, Mich., a corporation of Michigan No Drawing. Application March 4, 1943, Serial No. 477,998

2 Claims. (Cl. 260—236.5)

The invention relates to new products and new compounds useful for their therapeutic and nutritional properties, and includes methods for preparation of the same. The invention is more especially concerned with a new vitamin, apparently belonging to the B-complex group of vitamins, and derivatives thereof essential for growth and the prevention of pathological conditions in the animal organism such as the prevention of anemia or anemic states.

The new product in its acid form can be obtained from various animal sources. For example, it can be obtained from animal glandular tissues such as mammalian liver, or from kidney tissue. It is essential for the growth of bacteria and is also required for growth of the animal organism, yet it can be shown to be a different product from the known vitamins isolated from natural sources. Although it is effective in preventing certain types of anemia, such as anemia of chicks, and can be obtained from mammalian liver, the new vitamin substance can be shown to be different from those active principles which have been separated from liver.

It is an object of the invention to provide new and useful vitamin products of such purity as to be chemically pure or substantially chemically pure.

Another object of the invention is to supply new therapeutically and prophylactically active vitamin products in such pure condition that their potencies can readily be estimated, or standardized, and dosages predetermined with practical accuracy merely by weighing, serially diluting, or otherwise measuring out a given quantity of the same, thereby avoiding the necessity for the more troublesome and expensive tests on animals. This is an important object, in view of the fact that the product of the invention has multiple effects. Hence, separate tests or assays for each effect do not ordinarily need to be carried out. Due to the high degree of purity of our products, a given weight of the same will consistently exercise substantially the same effect or effects.

Further objects of the invention are practical processes for the treatment of animal tissues whereby the new products are separated and concentrated economically.

The above and other objects of the invention are attained by following the example given below. The example is presented by way of illustrating the invention which, in its broader features, embodies use of other similar materials and equivalent procedures mentioned herein or which will occur to those skilled in the art.

Example 6,000 lbs. of hog liver, which have been frozen fresh and then allowed to thaw a day or two at room temperature, are extracted with hot water, the pH of the aqueous extract adjusted to about 4.6 with hydrochloric acid and the volume of the extract brought to 375 gallons by adding water. The acidified aqueous liver extract is run through about 135 lbs. of alkali free synthetic phenol-aldehyde resin type of ion exchange adsorbent known by the trade name of "Amberlite IR–4." This amount of adsorbent is used in a Monel metal percolator, and the liver extract is run through it at a rate of about 10 gallons per hour. Thereafter, 100 gallons of distilled water are run through at a rate of about 20 gallons per hour in order to rinse off and remove certain impurities and solids from the resin adsorbent.

The adsorbent with the activity adsorbed from the liver extract is placed in a 250 gallon Inconel metal tank and 75 gallons of water and 50 gallons of strong ammonia water are added and the mixture stirred vigorously for ½ hour. At the end of the mixing, the material in the tank is allowed to settle and then the clear supernatant liquid containing the desired activity is drawn off into a vacuum still and concentrated. The adsorption and the subsequent desorption or elution with alkaline solution can be repeated one or more times and the eluates from each operation can be combined and concentrated together if desired. The vacuum concentration is continued until the concentrate has a pH of about 6.2. The volume is then about 21 gallons.

Water is added to the 21 gallons to bring it to a volume of 150 gallons. The pH is brought to about pH 3 with 11 pints and 2 ounces of concentrated hydrochloric acid. 150 lbs. of activated bentonite clay filter-aid, known by the trade name of "Super Filtrol," are stirred into the acid solution for two hours and the mixture then filtered in a plate and frame press, using cloth as the filter medium.

The Super Filtrol adsorbate is scraped from the press into a large glass-lined tank, 90 gallons of water added, followed by 40 gallons of strong ammonia water, and the mixture is then stirred slowly for an hour. It is now filtered through cloth on a plate and frame press. The press cake can be treated with ammonia water again and filtered. The combined filtrates, or eluates, containing the activity are then concentrated in vacuo to 9 gallons.

The 9 gallons of concentrate are diluted to about 50 gallons with water, and hydrochloric acid added to give a pH of about 3. There is then added 25 lbs. of activated charcoal, known by the trade name of "Norite A," and the mixture is stirred for one-half hour and filtered through a press. The filtrate is inactive. The filter cake adsorbate is treated with a 5 to 10% aqueous ammonium hydroxide solution at the temperature of a steam bath for about 30 minutes and filtered. The filter cake is again eluted with ammonium hydroxide solution and the two filtrates combined and concentrated to about 5 gallons, using low temperature and a vacuum. In consequence of loss of ammonia, the concentrate now has an acidity of about pH 5 to 7.

At this point, a small measured portion of the concentrate can be evaporated to dryness to determine the solids per unit of volume and a sample of the concentrate can be assayed on chicks to determine anti-anemia vitamin potency. This can be done by feeding day-old white Leghorn chicks a ration which will produce anemia (evidenced by a hematocrit value of 20% or less) and then determine the least amount of the vitamin product that will either cure or prevent anemia. Under these conditions a curative unit is defined as the least amount of the test substance, given in 6 doses on alternate days, that will raise the hematocrit value from 20% (or less) up to an average of 30% (or more), by volume, in at least 60% of the chicks. Similarly, a prophylactic unit is defined as the least amount of the test substance, incorporated in the diet, that will maintain over a 4-week assay, a gain in weight and a hematocrit value approximately comparable with that of the normal control chicks.

The following anemia-producing diet can be used for these tests:

| | Grams |
|---|---|
| Casein, purified | 25.00 |
| Casein, purified+Biotin Conc.[1] | 5.00 |
| Cornstarch | 36.00 |
| Lard | 16.85 |
| Salts (O and U) | 3.9 |
| Mn SO$_4$.4H$_2$O | 0.1 |
| Cellu flour | 3.0 |
| Gelatin | 10.0 |
| Vitamin mixture (ADEK)[2] | 0.15 |
| Vitamin mixture (B Complex)[3] | 0.10 |
| Choline HCl | 0.20 |
| Pantothenic acid | .01 |

Vitamins per 100 grams of ration:

1. 20 micrograms of biotin
2. 320 international units of vitamin A,
   32 international units of vitamin D,
   10 milligrams of 2-methyl-1,4-naphthoquinone and 4 milligrams of α-tocopherol
3. Thiamine, 0.4 milligram
   Riboflavin, 0.4 milligram
   Pyridoxine, 0.6 milligram
   Inositol, 50.0 milligrams
   Para amino-benzoic acid, 15.0 milligrams
   Nicotinic acid, 0.5 milligram The liver extract in this ration is made by grinding fresh liver, spreading the ground liver in thin layers, drying at 70°, regrinding, extracting with 95% alcohol at 70° C. and filtering the hot extract.

If the liver concentrate at this point does not assay about 500 chick units, it may be necessary to repeat the above described charcoal adsorption procedure. Instead of using ammonium hydroxide to elute the vitamin from the charcoal, a phenol may be used, e. g. a 90% solution of ordinary phenol, although ammonium hydroxide is cheaper.

The neutral or slightly acid (pH in the range of about 5 to 7) aqueous concentrate obtained following the charcoal adsorption step, as described above, is now further purified by extracting it with butanol, in which the activity at this pH does not dissolve. The butanol extracts some impurities and is discarded. Instead of, or in addition to, butanol one can use butyl acetate, cyclohexanone or like solvent to take out impurities. The butanol-extracted aqueous concentrate is further acidified to a pH less than about 4. At this higher degree of acidity the vitamin is quantitatively extracted from its aqueous solution by means of butanol. Upon partially evaporating and then cooling this butanol extract, the activity separates out and is finally centrifuged or filtered off.

The solid vitamin product is taken up in a solvent, such as hot methanol, and the part which fails to dissolve consists of inactive material and is discarded. The methanol solution containing the vitamin is cooled and excess barium hydroxide solution added. A mixture of barium salts containing all of the vitamin precipitates out and is separated, for example by filtration. The barium salt mixture is treated with hot water and the insoluble fraction discarded. The cooled neutral aqueous filtrate containing the barium salt of the vitamin is then treated with a soluble zinc salt, such as zinc acetate, in order to precipitate the less soluble zinc salt of the vitamin. The zinc salt is filtered off and then converted to its soluble ammonium salt by treatment with ammonium oxalate solution which throws down a precipitate of insoluble zinc oxalate. The precipitate is filtered off and the filtrate brought to a definite acidity, thereby causing separation of the vitamin which is filtered off and dried. The free vitamin acid is thus separated in a substantially pure state.

If the utmost purity is desired, it may in some instances be necessary to repeat the purification over the barium and zinc salts, followed by the precipitation of the vitamin by acid. Alternatively, the substantially pure vitamin acid can be precipitated or crystallized from its chilled solutions, for example in a suitable solvent such as water, methanol, or a mixture of the two.

The product consists of yellowish orange colored clusters of microcrystals showing birefringence between crossed Nicol prisms. It is an acid. It is relatively insoluble in cold water and most organic solvents. Cold water dissolves approximately 0.01 mg. per cc., hot water approximately 1 mg. per cc., diluted methyl alcohol approximately 0.15 mg. per cc. and anhydrous butyl alcohol less than 0.005 mg. per cc. It is readily soluble in glacial acetic acid and in pyridine. It readily forms salts with bases, the sodium, ammonium and barium salts being readily soluble in water while the zinc, lead, mercury and silver salts are very insoluble. Cold half-saturated barium hydroxide solution dissolves approximately 2 mg. per cc. The compound contains only the elements of carbon, hydrogen, oxygen and nitrogen. It has a neutralization equivalent of approximately 135, as determined by direct titration with sodium hydroxide.

The new pure acid vitamin product is essential for the growth of bacteria such as L. casei and other bacteria. It will also promptly restore chicks to normal when they have been made anemic due to exclusion of the vitamin from their diet.

Sample analyses for the amorphous form of the acid are,

|  | Per cent | Per cent |
|---|---|---|
| Carbon | 50.2 | 50.3 |
| Hydrogen | 5.3 | 5.4 |
| Nitrogen (Dumas) | 18.6 | 18.7 |
| Oxygen | 24.84 | 25.13 |
| Ash | 1.06 | 0.47 |

Analyses for the crystalline acid give no ash and slightly higher carbon and nitrogen percentages.

Bacterial growth activity, e. g. for lactobacillus casei, is lost on treating the compound with acetic anhydride in pyridine, oxidation with ammoniacal silver solution, refluxing with thionyl chloride, oxidation with bromine water, treatment with diazomethane or with nitrous acid and by irradiation with ultraviolet light. Bacterial growth activity is not destroyed by semicarbazide or hydroxylamine. The product gives negative reactions in the biuret, murexide and Molisch tests.

The compound can be converted to its esters, e. g. its methyl ester or other alkyl ester in the usual manner with an alcohol, e. g. with methyl alcohol and hydrochloric acid. The methyl ester can be obtained as a crystalline derivative. The free acid can be regenerated from the crystalline methyl ester by alkaline hydrolysis.

The new acid product dissolved in $$\frac{N}{10}$$

sodium hydroxide solution does not perceptibly rotate the plane of polarized light at the D line of sodium when examined in 0.35% solution in a 1 decimeter tube.

The compound has a characteristic ultraviolet absorption spectrum. The spectrum in .005 N sodium hydroxide exhibits three absorption maxima very close to the wave lengths 256m$\mu$, 282m$\mu$, and 365m$\mu$, with $$E\frac{1\%}{1\ cm.}$$

of approximately 542, 531, and 194 respectively, and absorption minima very close to the wave lengths 235m$\mu$, 268m$\mu$, and 333m$\mu$, with $$E\frac{1\%}{1\ cm.}$$

of approximately 299, 476 and 135 respectively. Decreasing the pH of the solution decreases the extinction at the maxima at wave lengths 256m$\mu$ and 365m$\mu$ and increases the extinction at 282m$\mu$.

The free acid and its methyl ester gradually darken with charring and without melting on heating. Depending on the rate of heating, decomposition sets in, as evidenced by darkening of color, at around 250° C. and a gradual charring as the temperature is raised to 360° C.

In carrying out the process, any suitable crude aqueous animal glandular extract, such as liver or kidney extract, may be used as starting material. Even liver press juices may be used.

Although more or less fresh glandular tissue can be treated as described in the example, we have found that improved yields of the vitamin product are obtained by starting with glandular tissue which has been allowed to stand a day or two at room temperature, or for shorter periods up to about 24 hours when the temperature is higher, say at 37° C. This permits autolysis to occur.

We have also found it preferable to freeze the glandular tissue and then thaw it out before extracting it. By allowing the frozen tissue to stand for a considerable time, such as a week or a month, or even longer, if desired, good yields are obtainable by immediately extracting the tissue as soon as it has thawed out. Alternatively, one can subject the tissue to a short period of standing in the frozen state and, after thawing, permit it to then stand a day or so at room temperature or higher.

Regardless of whether the freezing or application of similar treatment for rupturing the cells of the glandular tissues is used, the autolytic treatment is of great practical value for obtaining good yields of vitamin product.

What we claim as our invention is:

1. A compound of the class consisting of an organic acid, its salts and its esters, said acid being the acid derived by autolysis of mammalian liver tissue and being free from pantothenic acid and the antipernicious anemia principle obtainable from said liver tissue, and containing the elements carbon, hydrogen, oxygen, and nitrogen, having in .005 N sodium hydroxide solution ultraviolet absorption maxima very close to the wave lengths 256m$\mu$, 282m$\mu$, and 365m$\mu$, with $$E\frac{1\%}{1\ cm.}$$

of approximately 542, 531, and 194 respectively, and absorption minima very close to the wave lengths 235m$\mu$, 268m$\mu$, and 333m$\mu$, with $$E\frac{1\%}{1\ cm.}$$

of approximately 299, 476 and 135 respectively, showing birefringence between crossed Nicol prisms when in its microcrystalline form and being colored yellowish orange in its amorphous form, both of said forms darkening and charring without melting upon heating, being relatively insoluble in cold water, much more soluble in hot water, readily soluble in glacial acetic acid and pyridine, and giving negative reactions in the biuret, murexide and Molisch tests and exercising an antianemia vitamin effect in chicks suffering from a deficiency of said acid and a growth-stimulating effect on lactobacillus casei.

2. An organic acid containing the elements carbon, hydrogen, oxygen, and nitrogen, said acid being the acid derived by autolysis of mammalian liver tissue and being free from pantothenic acid and the antipernicious anemia principle obtainable from the liver tissue, having in .005 N sodium hydroxide solution ultraviolet absorption maxima very close to the wave lengths 256m$\mu$, 282m$\mu$, and 365m$\mu$, with $$E\frac{1\%}{1\ cm.}$$

of approximately 542, 531, and 194 respectively, and absorption minima very close to the wave lengths 235mμ, 268mμ, and 333mμ, with $$E_{1\,cm.}^{1\%}$$

of approximately 299, 476 and 135 respectively, showing birefringence between crossed Nicol prisms when in its microcrystalline form and being colored yellowish orange in its amorphous form, both of said forms darkening and charring without melting upon heating, being relatively insoluble in cold water, much more soluble in hot water, readily soluble in glacial acetic acid and pyridine, and giving negative reactions in the biuret, murexide and Molisch tests and exercising an antianemia vitamin effect in chicks suffering from a deficiency of said acid and a growth-stimulating effect on lactobacillus casei.

JOSEPH J. PFIFFNER.
STEPHEN B. BINKLEY.
EDWARD S. BLOOM.
ARTHUR D. EMMETT.